UNITED STATES PATENT OFFICE.

HASCAL A. HOGEL, OF BROOKLYN, NEW YORK, ASSIGNOR TO HIMSELF AND COSMORE G. BRUCE, OF NEW YORK CITY.

IMPROVEMENT IN FERTILIZERS.

Specification forming part of Letters Patent No. 101,131, dated March 22, 1870.

*To all whom it may concern:*

Be it known that I, HASCAL A. HOGEL, of Brooklyn, Kings county and State of New York, have invented a new article of manufacture to be used as a Fertilizer, obtained from the flesh of animals; and I do hereby declare that the following is a full, clear, and exact description thereof.

I take the flesh of dead animals, such as horses, the fatty portions of which only have heretofore been utilized, and, if these have not been previously abstracted, I first treat it in a rotary boiler having one or both journals hollow, and connected with a steam-generator by a pipe or pipes, for the introduction of jets of steam, (such boilers are well known, and need not be described here;) and, after the fat has been thus extracted, I subject the flesh to a considerable pressure to drive out all liquid matter which it may contain.

When this residuum is taken from the press, it is to be thoroughly dried by exposure to heated air in any suitable vessel; and, after being dried, it is to be reduced to a powder by subjecting it to the action of a suitable mill, for which purpose I have found the Bogardus eccentric mill well adapted.

The matter, after being so treated, is a powder without offensive odor, which can be kept for any length of time in dry places, and which is a rich fertilizer, containing a larger percentage of nitrogenized ammonia than any similar product heretofore manufactured.

What is here claimed, and desired to be secured by Letters Patent, is—

The improved fertilizer herein described, prepared from dead animals by extracting the fat and treating the residuum substantially as set forth.

H. A. HOGEL.

Witnesses:
SYDNEY E. SMITH,
W. MORRIS SMITH.